(12) United States Patent
Mihailovici et al.

(10) Patent No.: US 8,935,274 B1
(45) Date of Patent: *Jan. 13, 2015

(54) SYSTEM AND METHOD FOR DERIVING USER EXPERTISE BASED ON DATA PROPAGATING IN A NETWORK ENVIRONMENT

(75) Inventors: Virgil N. Mihailovici, San Jose, CA (US); Jayashree Jagannath, Sunnyvale, CA (US); Kui Zhang, Cupertino, CA (US)

(73) Assignee: Cisco Technology, Inc, San Jose, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/778,899

(22) Filed: May 12, 2010

(51) Int. Cl.
G06F 17/30 (2006.01)
G06F 17/27 (2006.01)
G06F 17/21 (2006.01)
G06F 15/16 (2006.01)

(52) U.S. Cl.
USPC ........... 707/766; 707/758; 707/760; 707/770; 707/771; 707/805; 704/9; 704/10; 709/203; 709/206

(58) Field of Classification Search
USPC ......... 707/609, 705–711, 722–723, 726–728, 707/730–734, 748–750, 785–948, 758, 760, 707/766, 770, 771; 709/203–206, 217–220; 704/1, 6–10
See application file for complete search history.

(56) References Cited

U.S. PATENT DOCUMENTS

| | | | |
|---|---|---|---|
| 5,613,032 A | 3/1997 | Cruz et al. | |
| 5,677,901 A | 10/1997 | Iwamura | |
| 5,857,179 A | 1/1999 | Vaithyanathan et al. | |
| 5,961,582 A | 10/1999 | Gaines | |
| 6,012,053 A | 1/2000 | Pant et al. | |
| 6,026,388 A * | 2/2000 | Liddy et al. | 1/1 |
| 6,202,064 B1 * | 3/2001 | Julliard | 1/1 |

(Continued)

FOREIGN PATENT DOCUMENTS

CN 102648464 A 8/2012
EP 2483803 4/2011

(Continued)

OTHER PUBLICATIONS

Xuerui Wang et al. "Topics over Time: A NonMarkovContinuousTime Model of Topical Trends", KDD'06 Aug. 20-23, 2006, pp. 1-10.*

(Continued)

*Primary Examiner* — Srirama Channavajjala
(74) *Attorney, Agent, or Firm* — Patent Capital Group

(57) ABSTRACT

A method is provided in one example and includes receiving data propagating in a network environment, separating the data into one or more fields, evaluating at least some of the fields in order to identify nouns and noun phrases within the fields, and identifying selected terms within the nouns and noun phrases to be tagged. The selected terms are tagged with respective expertise tags. The method may also include receiving a search query for a particular expertise, the search query includes the selected terms. The method may also include matching the expertise tags to an end user in order to generate a response to the search query, the response includes an identifier of the end user. In more specific embodiments, the identifying of the selected terms includes using synaptic analysis or word occurrence counting. The expertise tags can be provided in a profile for the end user.

20 Claims, 5 Drawing Sheets

(56) References Cited

U.S. PATENT DOCUMENTS

| | | | |
|---|---|---|---|
| 6,301,586 B1 | 10/2001 | Yang et al. | |
| 6,304,283 B1 | 10/2001 | Kitagawa | |
| 6,345,253 B1 | 2/2002 | Viswanathan | |
| 6,446,061 B1* | 9/2002 | Doerre et al. | 707/738 |
| 6,466,654 B1* | 10/2002 | Cooper et al. | 379/88.01 |
| 6,721,697 B1* | 4/2004 | Duan et al. | 704/9 |
| 6,745,161 B1* | 6/2004 | Arnold et al. | 704/7 |
| 6,778,979 B2* | 8/2004 | Grefenstette et al. | 1/1 |
| 6,980,660 B1 | 12/2005 | Hind et al. | |
| 7,017,183 B1 | 3/2006 | Frey et al. | |
| 7,072,837 B2 | 7/2006 | Kemble et al. | |
| 7,099,867 B2 | 8/2006 | Okada et al. | |
| 7,260,312 B2 | 8/2007 | Srinivasan et al. | |
| 7,292,532 B2 | 11/2007 | Sakata et al. | |
| 7,350,227 B2 | 3/2008 | McGrew et al. | |
| 7,417,959 B2 | 8/2008 | Dorner et al. | |
| 7,457,808 B2 | 11/2008 | Gaussier et al. | |
| 7,493,369 B2 | 2/2009 | Horvitz et al. | |
| 7,509,491 B1 | 3/2009 | Wainner et al. | |
| 7,603,350 B1* | 10/2009 | Guha | 1/1 |
| 7,617,451 B2 | 11/2009 | Jones et al. | |
| 7,698,442 B1 | 4/2010 | Krishnamurthy et al. | |
| 7,706,265 B2 | 4/2010 | Monette et al. | |
| 7,809,714 B1* | 10/2010 | Smith | 707/713 |
| 7,818,215 B2 | 10/2010 | King et al. | |
| 7,827,191 B2 | 11/2010 | Williams | |
| 7,853,553 B2 | 12/2010 | Lankinen et al. | |
| 7,913,176 B1 | 3/2011 | Blattner et al. | |
| 8,015,250 B2 | 9/2011 | Kay | |
| 8,051,204 B2 | 11/2011 | Kai et al. | |
| 8,214,209 B2 | 7/2012 | Nagatomo | |
| 8,255,386 B1 | 8/2012 | Annau et al. | |
| 8,260,774 B1 | 9/2012 | Aggarwal | |
| 8,374,983 B1 | 2/2013 | Pohl et al. | |
| 2002/0032772 A1 | 3/2002 | Olstad et al. | |
| 2002/0035605 A1 | 3/2002 | McDowell et al. | |
| 2002/0087311 A1 | 7/2002 | Leung Lee et al. | |
| 2002/0091741 A1 | 7/2002 | Ferreira et al. | |
| 2002/0093915 A1 | 7/2002 | Larson | |
| 2002/0188599 A1* | 12/2002 | McGreevy | 707/3 |
| 2003/0014399 A1 | 1/2003 | Hansen et al. | |
| 2003/0014448 A1 | 1/2003 | Castellanos et al. | |
| 2003/0014586 A1 | 1/2003 | Mitsuda et al. | |
| 2003/0028773 A1 | 2/2003 | McGarvey et al. | |
| 2003/0028896 A1 | 2/2003 | Swart et al. | |
| 2003/0033288 A1 | 2/2003 | Shanahan et al. | |
| 2003/0074555 A1 | 4/2003 | Fahn et al. | |
| 2003/0093789 A1 | 5/2003 | Zimmerman et al. | |
| 2004/0049714 A1 | 3/2004 | Marples et al. | |
| 2004/0158609 A1 | 8/2004 | Daniell et al. | |
| 2004/0193426 A1 | 9/2004 | Maddux et al. | |
| 2004/0208123 A1 | 10/2004 | Sakata et al. | |
| 2004/0258396 A1 | 12/2004 | Nakamura et al. | |
| 2005/0004922 A1 | 1/2005 | Zernik | |
| 2005/0060283 A1 | 3/2005 | Petras et al. | |
| 2005/0063352 A1 | 3/2005 | Amara et al. | |
| 2005/0068167 A1 | 3/2005 | Boyer et al. | |
| 2005/0076198 A1 | 4/2005 | Skomra et al. | |
| 2005/0086197 A1 | 4/2005 | Boubez et al. | |
| 2005/0097098 A1* | 5/2005 | Mazner et al. | 707/3 |
| 2005/0102522 A1 | 5/2005 | Kanda | |
| 2005/0108001 A1* | 5/2005 | Aarskog | 704/10 |
| 2005/0160166 A1* | 7/2005 | Kraenzel | 709/224 |
| 2005/0272405 A1 | 12/2005 | Tomlinson et al. | |
| 2006/0048210 A1 | 3/2006 | Hildre et al. | |
| 2006/0149781 A1 | 7/2006 | Blankinship | |
| 2006/0150253 A1 | 7/2006 | Feuerstein et al. | |
| 2006/0168213 A1 | 7/2006 | Richardson et al. | |
| 2006/0206483 A1* | 9/2006 | Knepper et al. | 707/7 |
| 2006/0224587 A1 | 10/2006 | Zamir et al. | |
| 2006/0285493 A1 | 12/2006 | Manuja et al. | |
| 2007/0016583 A1 | 1/2007 | Lempel et al. | |
| 2007/0038437 A1 | 2/2007 | Brun | |
| 2007/0106908 A1 | 5/2007 | Miyazaki et al. | |
| 2007/0118275 A1 | 5/2007 | Qi et al. | |
| 2007/0198725 A1 | 8/2007 | Morris | |
| 2007/0206617 A1 | 9/2007 | Andreasen et al. | |
| 2007/0239680 A1 | 10/2007 | Oztekin et al. | |
| 2007/0239837 A1 | 10/2007 | Jablokov et al. | |
| 2007/0244892 A1* | 10/2007 | Narancic | 707/7 |
| 2007/0253682 A1 | 11/2007 | Chang et al. | |
| 2007/0260684 A1 | 11/2007 | Sharma et al. | |
| 2007/0266020 A1 | 11/2007 | Case et al. | |
| 2007/0294265 A1 | 12/2007 | Askew et al. | |
| 2008/0027981 A1 | 1/2008 | Wahl | |
| 2008/0060055 A1 | 3/2008 | Lau | |
| 2008/0065892 A1 | 3/2008 | Bailey et al. | |
| 2008/0077791 A1 | 3/2008 | Lund et al. | |
| 2008/0091670 A1* | 4/2008 | Ismalon | 707/5 |
| 2008/0097985 A1 | 4/2008 | Olstad et al. | |
| 2008/0104128 A1 | 5/2008 | Drayer et al. | |
| 2008/0126690 A1 | 5/2008 | Rajan et al. | |
| 2008/0140674 A1 | 6/2008 | Ishikawa | |
| 2008/0154873 A1 | 6/2008 | Redlich et al. | |
| 2008/0184326 A1 | 7/2008 | Nakajima | |
| 2008/0189265 A1* | 8/2008 | Taranov et al. | 707/5 |
| 2008/0222142 A1 | 9/2008 | O'Donnell | |
| 2008/0244740 A1 | 10/2008 | Hicks et al. | |
| 2008/0294903 A1 | 11/2008 | Miyazaki et al. | |
| 2008/0295040 A1 | 11/2008 | Crinon | |
| 2008/0313144 A1 | 12/2008 | Huston | |
| 2009/0006333 A1 | 1/2009 | Jones et al. | |
| 2009/0022472 A1 | 1/2009 | Bronstein et al. | |
| 2009/0049053 A1 | 2/2009 | Barker et al. | |
| 2009/0055175 A1 | 2/2009 | Terrell et al. | |
| 2009/0112678 A1 | 4/2009 | Luzardo | |
| 2009/0119278 A1 | 5/2009 | Cross et al. | |
| 2009/0182727 A1* | 7/2009 | Majko | 707/5 |
| 2009/0196570 A1 | 8/2009 | Dudas et al. | |
| 2009/0210715 A1 | 8/2009 | Izu et al. | |
| 2009/0226870 A1 | 9/2009 | Minotti | |
| 2009/0234497 A1 | 9/2009 | Uejo | |
| 2009/0234834 A1 | 9/2009 | Cozzi | |
| 2009/0254572 A1 | 10/2009 | Redlich et al. | |
| 2009/0276377 A1 | 11/2009 | Dutta et al. | |
| 2009/0281970 A1* | 11/2009 | Mika et al. | 706/12 |
| 2009/0293016 A1 | 11/2009 | Potevin et al. | |
| 2009/0319365 A1 | 12/2009 | Waggoner et al. | |
| 2009/0327271 A1* | 12/2009 | Amitay et al. | 707/5 |
| 2010/0005306 A1 | 1/2010 | Izu et al. | |
| 2010/0010968 A1* | 1/2010 | Redlich et al. | 707/3 |
| 2010/0057815 A1 | 3/2010 | Spivack et al. | |
| 2010/0088331 A1 | 4/2010 | White et al. | |
| 2010/0153855 A1 | 6/2010 | Roberts et al. | |
| 2010/0179801 A1 | 7/2010 | Huynh et al. | |
| 2010/0217975 A1 | 8/2010 | Grajek et al. | |
| 2010/0223581 A1 | 9/2010 | Manolescu et al. | |
| 2010/0223629 A1 | 9/2010 | Appelbaum et al. | |
| 2010/0250547 A1 | 9/2010 | Grefenstette et al. | |
| 2010/0274815 A1 | 10/2010 | Vanasco | |
| 2010/0280985 A1* | 11/2010 | Duchon et al. | 706/52 |
| 2011/0078167 A1 | 3/2011 | Sundaresan et al. | |
| 2011/0078550 A1 | 3/2011 | Nabutovsky | |
| 2011/0099195 A1 | 4/2011 | Patwardhan et al. | |
| 2011/0119264 A1* | 5/2011 | Hu et al. | 707/728 |
| 2011/0161409 A1 | 6/2011 | Nair et al. | |
| 2011/0173260 A1 | 7/2011 | Biehl et al. | |
| 2011/0196802 A1 | 8/2011 | Ellis et al. | |
| 2011/0208522 A1 | 8/2011 | Pereg et al. | |
| 2011/0225048 A1 | 9/2011 | Nair | |
| 2011/0231296 A1 | 9/2011 | Gross et al. | |
| 2011/0252330 A1 | 10/2011 | Catlin et al. | |
| 2011/0270709 A1 | 11/2011 | Lewis et al. | |
| 2011/0270843 A1 | 11/2011 | Albin | |
| 2011/0304685 A1 | 12/2011 | Khedouri et al. | |
| 2012/0002544 A1 | 1/2012 | Kokku et al. | |
| 2012/0030232 A1 | 2/2012 | John et al. | |
| 2012/0046936 A1 | 2/2012 | Kandekar et al. | |
| 2012/0078952 A1 | 3/2012 | Araya | |
| 2012/0081506 A1 | 4/2012 | Marvit | |
| 2012/0102050 A1 | 4/2012 | Button et al. | |

(56) References Cited

U.S. PATENT DOCUMENTS

| | | | |
|---|---|---|---|
| 2012/0110087 A1 | | 5/2012 | Culver et al. |
| 2012/0185239 A1 | | 7/2012 | Goud et al. |
| 2012/0271805 A1 | | 10/2012 | Holenstein et al. |

FOREIGN PATENT DOCUMENTS

| | | | |
|---|---|---|---|
| WO | WO 97/04405 | * | 2/1997 |
| WO | WO02/42864 | | 5/2002 |
| WO | WO 02/42940 | * | 5/2002 |
| WO | WO2011/041443 | | 4/2011 |
| WO | WO2012/173780 | | 12/2012 |

OTHER PUBLICATIONS

Martin S. Lacher et al. "On the Integration of Topic Maps and RDF Data",Extreme Markup Languages 2001, pp. 1-14.*
Grimes, Seth "Sentiment Analysis: Opportunities and Challenges," Beye Network; Jan. 22, 2008; 6 pages; http://www.b-eye-network.com/view/6744.
iLogos v1.5 download (win); 4 pages, [Retrieved and printed on May 28, 2010] from http://www.phil.cmu.edu/projects/argument_mapping/.
Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.
Moorthi, Y. L. R., "Have Breakfast or Be Breakfast," Wall Street Journal, Feb. 8, 2010, 2 pages; http://online.wsj.com/article/SB126465641868236415.html#printMode.
Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.
Trant, Jennifer, "Studying Social Tagging and Folksonomy: A Review and Framework ," Jan. 2009, 10(1) Journal of Digital Information; 42 pages; http://dlist.sir.arizona.edu/arizona/handle/10150/105375.
U.S. Appl. No. 12/971,852, flied Dec. 17, 2010 entitled "System and Method for Providing Argument Maps Based on Activity in a Network Environment," Inventor(s): Deepti Patil, et al.
U.S. Appl. No. 12/971,946, filed Dec. 17, 2010 entitled "System and Method for Providing Feeds Based on Activity in a Network Environment," Inventor(s): Satish K. Gannu et al.
Ohl, Ricky, "Computer Supported Argument Visualisation: Modelling Wicked Problems," Ph.D. Thesis, Australian Digital Theses Program, Feb. 2008; 431 pgs.; http://gu.edu.au:8080/adt-root/public-adt-QGU20090724.155249/index.html.
PCT Notification of Transmittal (1 page) of the International Search Report (3 pages), and Written Opinion of the International Searching Authority, or the Declaration (6 pages) mailed Jan. 12, 2011 for PCT/US2010/050762.
Chen, Hsinchun, et al., "A Concept Space Approach to Addressing the Vocabulary Problem in Scientific information Retrieval: An Experiment on the Worm Community System," Journal of the American Society for information Science Wiley for Asis USA, vol. 48, No. 1, Jan. 1997, XP002614340, ISSN: 0002-8231; pp. 17-31.
Chen, Rung-Ching et al., "Adding New Concepts on the Domain Ontology Based on Semantic Similarity," International Conference on Business and Information, Jul. 12-14, 2006, XP002614339; 14 pages; http://bai2006.atisr.org/CD/Papers/2006bai6169.pdf.
Sethy, Abhinav, et al., "Building Topic Specific Language Models from Webdata Using Competitive Models," 9th European Conference on Speech Communication and Technology, Eurospeech Interspeech 2005 International Speech and Communication Association Fr., 2005, pp. 1293-1296; XP002614341; http://sail.usc.edu/publications/sethy-euro2005.pdf.

U.S. Appl. No. 13/088,974, filed Apr. 18, 2011, entitled "System and Method for Providing Augmented Data in a Network Environment," Inventor(s) Satish K. Gannu et al.
Caslon Analytics Echelon Note: Overview, May 2006, 6 pages; printed Sep. 30, 2009 http://www.caslon.com.au/echelonnote.htm.
Andreas Hess, et al., "From Web 2.0 to Semantic Web: A Semi-Automated Approach," 15 pages; printed Sep. 30, 2009; http://www.andreas-hess.info/publications/hess-cisweb08.pdf.
Wikipedia, "Homophone," 3 pages; printed Sep. 30, 2009; http://en.wikipedia.org/wiki/Homophone.
R. Billi et al., "Interactive Voice Technology at Work: The CSELT Experience," 2nd IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.
Wikipedia, "International Phonetic Alphabet," 19 pages; printed Sep. 30, 2009; http://en.wikipedia.org/wiki/International_Phonetic_Alphabet.
"The LNTS Leap: Phoneme Recognition," 2 pages; printed Sep. 30, 2009; http://www.lntstech.com.
NSA Watch, "Other Surveillance Network: Governmental Surveillance Agencies," 2 pages; printed Sep. 30, 2009; http://www.nsawatch.org/networks.html.
Nexidia, "Audio and Speech Analytics Software," 1 page; printed Sep. 30, 2009; http://www.nexidia.com.
Ronnie W. Smith, "Performance Measures for the Next Generation of Spoken Natural Language Dialog Systems," pp. 37-40; http://acl.ldc.upenn.edu/W/W97/W97-0607.pdf.
Wikipedia, "Phoneme," 7 pages; printed Sep. 30, 2009; http://en.wikipedia.org/wiki/Phoneme.
N.S. Jadhav and I.N. Dwivedi, "Social computing based personal vocabulary building," 5 pages; printed Sep. 30, 2009; http://www.priorartdatabase.com/IPCOM/000173550/.
Carnegie Mellon University, "Speech at CMU," 4 pages; printed Sep. 30, 2009; http://www.speech.cs.cmu.edu/speech/.
Professor Anita Wasilewska, CSE 634—Data Mining: Text Mining; 85 pages; www.cs.sunysb.edu/~cse634/presentations/TextMining.pdf.
Trampoline Systems, "Navigation," 2 pages; printed Sep. 30, 2009; www.trampolinesystems.com.
Pete Swabey, "Making the Invisible Visible," 2 pages; Sep. 23, 2009; http://www.trampolinesystems.com/news/in+the+news/archive/2009/59.
WebChoir Products—Personal Vocabulary Tools, "Personal Tools," 1 page; printed Sep. 30, 2009 http://www.webchoir.com/products/ptt.html.
U.S. Appl. No. 12/571,390, filed Sep. 30, 2009, entitled "System and Method for Generating Vocabulary From Network Data," Inventor(s): Thangavelu Arumugam, et al.
U.S. Appl. No. 12/471,404, filed Sep. 30, 2009, entitled "System and Method for Generating Personal Vocabulary from Network Data," Inventor(s): Satish K. Gannu, et al.
U.S. Appl. No. 12/571,414, filed Sep. 30, 2009, entitled "System and Method for Providing Speech Recognition Using Personal Vocabulary in a Network Environment," Inventor(s): Satish K. Gannu, et al.
U.S. Appl. No. 12/571,421, filed Sep. 30, 2009, entitled "System and Method for Ensuring Privacy While Tagging Information in a Network Environment," Inventor(s): Satish K. Gannu, et al.
U.S. Appl. No. 12/571,426, filed Sep. 30, 2009, entitled "System and Method for Controlling an Exchange of Information in a Network Environment," Inventor(s): Satish K. Gannu, et al.
U.S. Appl. No. 12/475,486, filed Jun. 3, 2009, entitled "Authentication via Monitoring," Inventor(s): David McGrew and Sandeep Rao.
Nortel Networks Wireless Solutions (A. Silver, J. Larkins, D. Stringer), "Unified Network Presence Management," A White Paper, © 2000, 6 pages, www.mobilein.com/UNPM.pdf.
W.A. Montgomery, et al., "Network Intelligence for Presence Enhanced Communication," Spirits Working Group, May 2002, 9 pages, http://ietfreport.isoc.org/all-ids/draft-montgomery-copeland-presence-spirits-00.txt.
J. Kohl and C. Neuman, The Kerberos Network Authentication Service (V5), Network Working Group, RFC 1510, Sep. 1993, 105 pages, http://www.ietf.org/rfc/rfc1510.

(56) References Cited

OTHER PUBLICATIONS

Lancope, "Stealth Watch," Revolutionize the Way You View Your Network, © 2009, 8 pages http://storage.pardot.com/2382/9637/StealthWatch_System_Family_Brochure.pdf.

E. Horviz, et al., "Coordinate: Probabilistic Forecasting of Presence and Availability," 2002, 10 pages, ftp://ftp.research.microsoft.com/pub/ejh/coordinate.pdf.

Andreas Hess, et al., "Multi-Value Classification of Very Short Texts," 8 pages, printed on May 12, 2010, http://www.andreas-hess.info/publications/hess-ki08.pdf.

U.S. Appl. No. 13/098,112, filed Apr. 29, 2011 entitled "System and Method for Evaluating Visual Worthiness of Video Data in a Network Environment", Inventors(s): Deepti Patil et al.

U.S. Appl. No. 13/098,434, filed Apr. 30, 2011 entitled "System and Method for Media Intelligent Recording in a Network Environment", Inventors(s): Ashutosh A. Malegaonkar et al.

Virage, "Audio Analysis," Autonomy Virage, © 2009 Autonomy Virage, 1 page http://www.virage.com/security-and-surveillance/functions/audio-analysis/index.htm.

Virage, "Understanding Video," Autonomy Virage, © Autonomy Virage, 5 pages http://www.virage.com/rich-media/technology/understanding-video/index.htm.

U.S. Appl. No. 13/160,701, filed Jun. 15, 2011 entitled "System and Method for Discovering Videos," Inventors(s) Ashutosh A. Malegaonkar, et al.

U.S. Appl. No. 13/149,405, filed May 31, 2011 entitled "System and Method for Evaluating Results of Search Query in a Network Environment," Inventor(s): Satish K. Gannu, et al.

U.S. Appl. No. 12/762,194, filed Apr. 16, 2010, entitled "System and Method for Deducing Presence Status from Network Data," Inventor(s): Thangavelu Arumugam, et al.

U.S. Appl. No. 13/182,862, filed Jul. 14, 2011 entitled "System and Method for Deriving User Expertise Based on Data Propagating in a Network Environment," Inventor(s): Satish K. Gannu, et al.

Rosella Data Mining & Database Analytics, "Web Search and Web Navigation Pattern Analyzer," 3 pages; printed Jul. 25, 2011; http://222.roselladb.com/surf-pattern-analyzer.htm.

Ohl, Ricky, "Computer Supported Argument Visualisation: Modelling Wicked Problems," Ph.D. Thesis, Australian Digital Theses Program, Feb. 2008; 431 pgs.; http://gu.edu.au:8080/adt-root/public/adt-QGU20090724.155249/index.html.

U.S. Appl. No. 13/364,102, filed Feb. 1, 2012 entitled "System and Method for Creating Customized On-Demand Video Reports in a Network Environment," Inventor(s): Deepti Patel, et al.

Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.

Masnick, Mike, "Creating an Automatic Highlight Reel for Sporting Events (Bleeding Edge)," TechDirt lite, Aug. 20, 2003, 2 pages http://www.techdirt.com/article_lite.php?sid=20030820/0042248&pid=17.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.

Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.

PCT Apr. 3, 2012 International Preliminary Report on Patentability and Wrtten Opinion of the International Searching Authority from International Application PCT/US2010/050762; 7 pages.

EPO Nov. 7, 2011 Response to Communication pursuant to Rule 161(1) and 162 from European Application No. 10770664; 8 pages.

PCT Oct. 4, 2012 Notification of Transmittal of the International Search Report and Written Opinion of the International Search Authority from Application PCT/US2012/040097; 15 pages.

Bollen, et al., "Usage Derived Recommendations for a Video Digital Library," Journal of Network and Computer Applications, Academic Press, New York, NY, vol. 30, No. 3, Mar. 16, 2007.

Umbrich J., et al., "Four Heuristics to Guide Structured Content Crawling," Eighth International Conference on WEB Engineering, 2008, Jul. 14, 2008; © 2008 IEEE DOI 10.1109/ICWE.2008.42.

U.S. Appl. No. 13/608,787, filed Sep. 10, 2012 entitled "System and Method for Enhancing Metadata in a Video Processing Environment," Inventor(s) Sandipkumar V. Shah, et al.

Seher, Indra, "Query Expansion in Personal Queries," IADIAS (International Association for Development of the Information Society) 2006, 5 pages www.iadis.org/Multi2006/papers/16/5023_ISA.

Jiang, Weiliang, et al., "A Method for Personal Query Based on Role Preference Ontology," Industrial Mechanatronics and Automation, ICIMA 2009 International Conference, pp. 479-481; Abstract Only, 1 page.

Yuen, L., et al., "Excalibur: A Personalized Meta Search Engine," Computer Software and Applications Conference 2004, COMPSAC 2004 Proceedings of the 28th Annual International, 2 pages.

Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.

"Google Custom Search," Web Page, Google.com, © 2012 Google, 1 page http://www.google.com/cse/.

Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.

"Recommender System," Wikipedia, Apr. 28, 2012; 9 pages http://en.wikipedia.org/wiki/Recommender_system.

"Click Scoring Relevance Framework," LucidWorks, 7 pages [retrieved and printed May 7, 2012] http://lucidworks.lucidimagination.com/display/lweug/Click+Scoring+Relevance+Framework.

Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.

Gligorov, User-generated Metadata in Audio-visual Collections, Proceedings of the International World Wide Web Conference, WWW 2012, Apr. 16-20, 2012, Lyon, France (2012); 5 pages.

Rodriguez, et al. Automatic Metadata Generation Using Associative Networks, ACM Transactions on Information Systems, vol. 27, No. 2, Article 7, Feb. 2009.

"Understanding Metadata," NISO Press, National Information Standards Organization, 2004, 20 pages.

Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.

Telestream, Inc. Product Literature, "Extracting and Preparing Metadata to Make Video Files Searchable," Telestream, Inc. 2008; 6 pages.

PCT Dec. 17, 2013 International Preliminary Report on Patentability from International Application Serial No. PCT/US2012/040097; 10 pages.

\* cited by examiner

FIG. 3

| TERM | TOP USER 1 | TOP USER 2 | | | |
|---|---|---|---|---|---|
| TERM 1 | USER 1 | USER 2 | USER | USER | USER |
| TERM 2 | USER 5 | USER 1 | USER | USER | USER |
| N-P1 | USER 6 | USER 8 | USER | USER | USER |
| ⋮ | ⋮ | ⋮ | ⋮ | ⋮ | ⋮ |
| N-Pn | USER 1 | USER 10 | USER | USER | USER |

START

110 — EACH TERM IN THE VOCABULARY CAN BE MAINTAINED SUCH THAT IT CAN BE READILY SEARCHED

120 — RUN QUERY QUERY = "TERM"

130 — CURRENT INDEX

140 — RUN FACETING ON AUTHORS FIELD

REPEAT FOR ALL REMAINING USERS

160 — SORT AND EXTRACT TOP AUTHORS

150 — NUMBER OF TOP AUTHORS (CONFIGURATION)

170 — THE PARTICULAR EXPERTISE TAG CAN BE ATTACHED TO SPECIFIC USER PROFILES

END

| USER 1 | TOP TERM 1 | ...TOP TERM LAST | TERM | ••• | TERM |
|---|---|---|---|---|---|
| USER 2 | TOP TERM 1 | ...TOP TERM LAST | TERM | ••• | TERM |
| USER 3 | TOP TERM 1 | ...TOP TERM LAST | TERM | ••• | TERM |
| ⋮ | ⋮ | ⋮ | ⋮ | ⋮ | ⋮ |
| USER N | TOP TERM 1 | ...TOP TERM LAST | TERM | ••• | TERM |

92

SYSTEM AND METHOD FOR DERIVING USER EXPERTISE BASED ON DATA PROPAGATING IN A NETWORK ENVIRONMENT

TECHNICAL FIELD

This disclosure relates in general to the field of communications and, more particularly, to deriving user expertise based on data propagating in a network environment.

BACKGROUND

The field of communications has become increasingly important in today's society. In particular, the ability to effectively gather, associate, and organize information presents a significant obstacle for component manufacturers, system designers, and network operators. Identifying potential experts can be helpful to any business entity. Such experts can provide a practical resource that obviates the need to develop knowledge, which has already been accumulated. As new communication platforms and technologies become available, new protocols should be developed in order to optimize usage of these emerging protocols. Certain issues have arisen in data monitoring scenarios in which experts are sought to be identified.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified table illustrating a series of example users and terms associated with the communication system;

FIG. 4 is a simplified flowchart illustrating a set of example steps associated with the communication system;

DETAILED DESCRIPTION OF EXAMPLE EMBODIMENTS

Overview

A method is provided in one example and includes receiving data propagating in a network environment, separating the data into one or more fields, evaluating at least some of the fields in order to identify nouns and noun phrases within the fields, and identifying selected terms within the nouns and noun phrases to be tagged. The selected terms are tagged with respective expertise tags. The method may also include receiving a search query for a particular expertise, the search query includes the selected terms. The method may also include matching the expertise tags to an end user in order to generate a response to the search query, the response includes an identifier of the end user. In more specific embodiments, the identifying of the selected terms can include using synaptic analysis or word occurrence counting to identify the selected terms to be tagged with the expertise tags. The expertise tags can be provided in a profile for the end user.

In yet other embodiments, the method can include deriving an absolute or relative expertise for a search query. In still other embodiments, the method can include maintaining a list of emerging topics associated with specific areas of expertise, where the emerging topics can be determined by aggregating occurrences of emerging topic terms associated with additional data propagating in the network environment. The nouns and noun phrases can be maintained within a database, where a counter for the selected nouns and noun phrases can be incremented as they appear in additional data propagating in the network environment.

Example Embodiments

Figure 1:
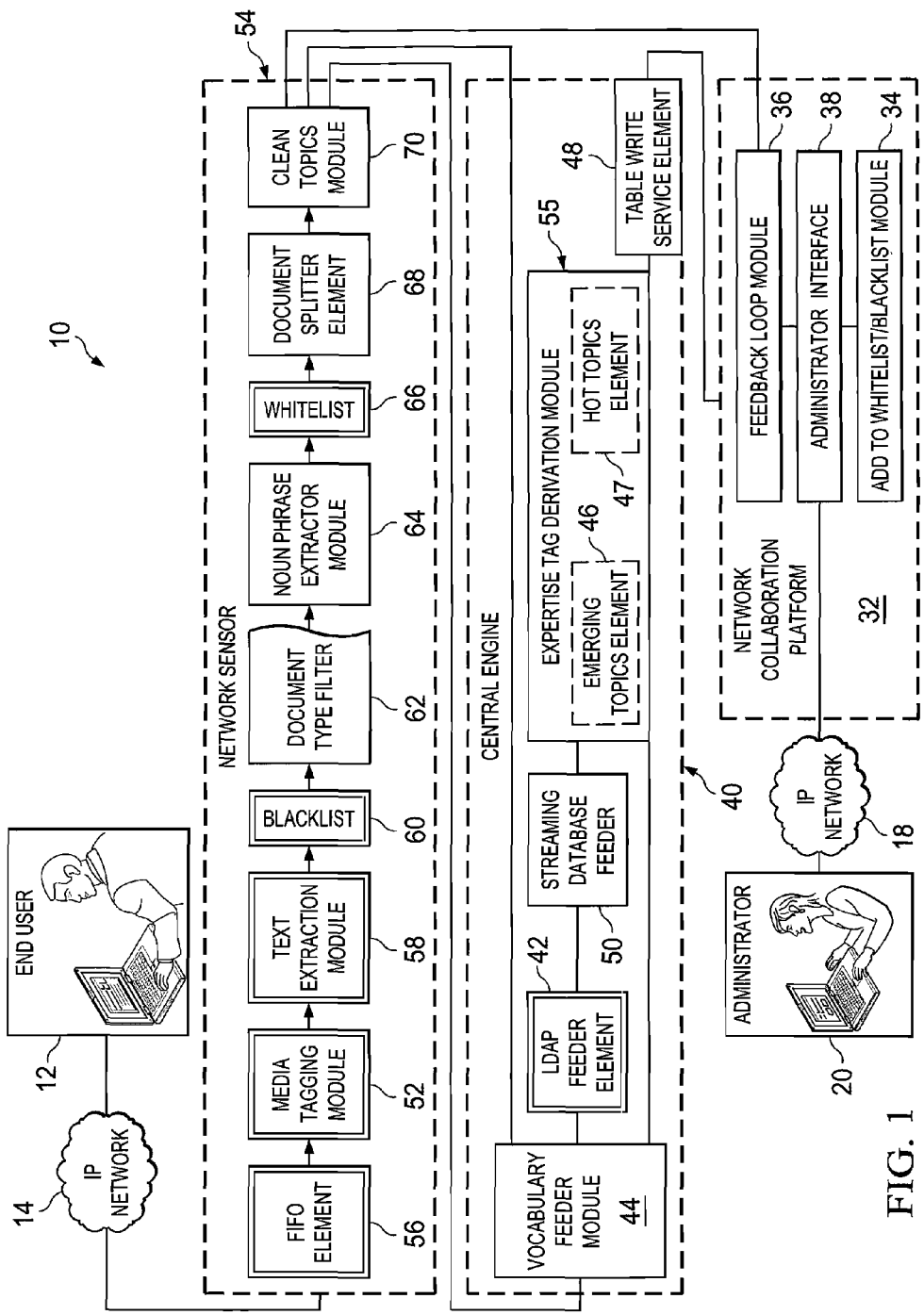
FIG. 1 is a simplified block diagram of a communication system for deriving user expertise based on data propagating in a network environment in accordance with one embodiment of the present disclosure.

FIG. 1 is a simplified block diagram of a communication system 10 for deriving user expertise based on collected network data, which propagates in a network environment. FIG. 1 may include an end user 12, who is operating a computer device that is configured to interface with an Internet Protocol (IP) network 14. In addition, an administrator 20 is provided, where administrator 20 has the ability to interface with the architecture through an IP network 18. Communication system 10 may further include a network collaboration platform (NCP) 32, which includes an add to whitelist/blacklist module 34, a feedback loop module 36, and an administrator interface 38. FIG. 1 may also include a central engine 40, which includes a lightweight directory access protocol (LDAP) feeder element 42, a vocabulary feeder module 44, and a table write service element 48. FIG. 1 may also include an expertise tag derivation module 55, which further includes an emerging topics element 46 and a hot topics element 47. A streaming database feeder 50 can also be provided just before expertise tag derivation module 55.

FIG. 1 may also include a network sensor 54 that includes a first in, first out (FIFO) element 56, a media tagging module 52, a text extraction module 58, a blacklist 60, a document type filter 62, a noun phrase extractor module 64, a whitelist 66, a document splitter element 68, and a clean topics module 70. Multiple network sensors 54 may be provisioned at various places within the network and such provisioning may be based on how much information is sought to be tagged, the capacity of various network elements, etc.

Note that in generating a large corpus of vocabulary words, several issues arise in the context of locating experts based on keyword queries. Communication system 10 can offer an intelligent filtering of words in order to optimally identify potential experts. In one particular example, communication system 10 can automatically derive 'expertise tags' (e.g., topics that may be part of someone's domain of expertise) using an expertise location system and related statistics. The actual tags can be developed by expertise tag derivation module 55. In operational terms, an expertise location interface (e.g., administrator interface 38) can be used to query a corpus (i.e., a dataset) of information related to users of a system to determine experts for a particular search query. A response to the search query can include any type of identifier for the user being identified with a particular expertise. For example, the user identifier in the response can include a user ID, an e-mail address, an IP address, a first and/or last name, an employee identifier, etc.

Relevant words can be chosen to suggest 'expertise tags', which can offer topics that may reflect respective areas of expertise for corresponding users. Commonly, only a small percentage of users appropriately tag themselves (e.g., manually add a tag to their corresponding work profile). This results in a poor representation of possible experts within an organization. Communication system 10 can address this issue by automatically deriving user expertise based on existing data that propagates in a network. In regards to potential sources for the tags, when given the corpus of data, communication system 10 can be configured to examine network data to find words/noun phrases that are frequently used. Any suitable method can be used to mine the corpus of data (e.g., using syntactic analysis, counting word occurrence patterns, etc.). If a set of allowed words is previously known, then the occurrences of these words can be counted using any appropriate mechanism (e.g., streaming databases, standard databases, etc.).

Additionally, where the data is observed over a period of time, communication system 10 can determine topics that are emerging. 'Emerging' in this context can mean that initially, only a few occurrences appear in the corpus of data for a given set of words, but over time, the words become more prominent and/or popular. Such a scenario is typical for companies offering new products, or engaging in new services, projects, etc.

Note that as users generate search queries for experts, communication system 10 can aggregate the counts for each unique query over time. An inference can be made that the most used query terms would most probably represent topics of interest to a majority of users. Given the sets of topics, each topic can be maintained and, further, a set of experts for any particular topic can be readily identified. Each tag in a given data list can be representative of an expertise tag to be used for identifying the top experts in the organization. Any suitable type of threshold can be applied to select the 'best' expert out of the experts being returned by the system (e.g. score-based mechanisms [inclusive of peer review], percentage based (top 10%), weighting algorithms, feedback information, etc.).

In operation, a portion of the expert derivation can be performed regularly (e.g., daily), where new expertise tags are presented to the administrator/user for approval. For example, this ratification could symbolize a promotion of a particular expertise tag into a given end user's profile. The expertise can be part of the relevant aggregated vocabulary terms (e.g., groups of keywords for a networking company could include routing, switching, deep packet inspection, etc.). Note that the set of hot topics does not have to belong to the vocabulary term set. The hot topics could include any word (or term, or group of words), since the hot topics module is used to derive new suggestions for the vocabulary terms.

Expertise tag derivation module 55 can be used to generate a set of users deemed to have relevant expertise on a certain expertise topics. This number of topics can be readily configurable by an administrator. Expertise tag derivation module 55 can also generate a set of topics (expertise tags) for each user. Any of this possible expertise classification (or simple identification) can be included in a user's profile (e.g., in a querying or pull model). A set of hot topics per user can also be generated by expertise tag derivation module 55, where this number is also configurable by an administrator. This can further be used in a managerial view (e.g., for an end user, or for an administrator) to illustrate the user's top topics of interaction (e.g., pull model). A set of hot topics per system (e.g., per business segment) can also be generated, where this number is also configurable by an administrator. Furthermore, this can be used by an analytics module to display the top topics in the enterprise (e.g., pull model)

Note that there are several acceptable ways in which such tags can be derived. Depending on system-level architectural choices, various acceptable methodologies can be used to account for performance, memory, and central processing unit parameters. For example, one type of solution may make use of database technologies (e.g., Attivio, Truviso, etc.). Such solutions may be used in processing blocks associated with central engine 40. Additional details related to expertise derivation activities are provided below with reference to FIGS. 2-8. Before turning to those details, some primary information is offered related to how the underlying network data is aggregated, developed, and analyzed.

Communication system 10 can intelligently harvest network data from a variety of end users, and automatically create vocabulary by observing each user's interaction/traffic on the network. In a general sense, the architecture can isolate terms per person in order to define an end user's personal vocabulary. This information can subsequently be used to identify specific experts. Communication system 10 can intelligently and dynamically auto generate different lists of personal vocabulary per user without creating additional overhead for the end users.

As part of its vocabulary development activities, communication system 10 can tag words for specific end users. For example, relevant words identified in an enterprise system can be extracted from the documents that are flowing through the network. The tags can be categorized and then associated to the user, who generated or who consumed each document. In accordance with one example implementation, a tag can be given different weights depending on several potential document characteristics. [Note that the term 'tag' as used herein in this Specification is meant to connote any type of identifier (inclusive of a field, an object, a marker, a flag, etc.) that can be used in conjunction with communication system 10.] One characteristic relates to the type of document propagating in the network (for example, email, an HTTP transaction, a PDF, a Word document, a text message, an instant message, etc.). Another characteristic relates to the type of usage being exhibited by the end user. For example, the system can evaluate if the end user represents the producer of the content (e.g., the sender, the poster, etc.), or the consumer of the content (e.g., the recipient, the audience member, etc.). In one example, if the end user were posting a document including the identified vocabulary, the act of posting such words would accord the words a higher weight, than merely receiving an email that includes the particular vocabulary words. Stated in different terms, in a forum in which the end user is authoring a document to be posted (e.g., on a blog, on a corporate website, in a corporate engineering forum, etc.), vocabulary words within that document would have a higher associative value than if the words were propagating in lesser forums (e.g., a passive recipient in an email forum). Yet another characteristic relates to a probability of a term showing up in a document. (Note that multiple word terms have a lower probability of occurrence and, therefore, carry a higher weight when they are identified). In one instance, the tagged vocabulary words can be aggregated using streaming databases, where the aggregated tags can be stored and archived in a summarized format.

The resulting information may be suitably categorized in any appropriate format. For example, a dynamic database (e.g., table, list, etc.) can be generated for each individual user, each user-to-user communication (e.g., 1-1, N or N, etc.), and each type of document (e.g., email, phone conversation messages, Meeting Place meeting data, WebEx data, blog posting, White Paper, PDF, Word document, video file, audio file, text message, etc.). Essentially, any type of information propagating in the network can be suitably categorized in the corresponding database of the tendered architecture. Some of the possible database configurations are described below with reference to FIG. 2.

It should be noted that there are several different types of objects flowing through the architecture of communication system 10. Components within communication system 10 can identify which objects should be processed by particular components of the configuration. In operation of an example that is illustrative of business vocabulary being developed, at vocabulary feeder module 44, data can be sent by noun phrase extractor module 64, (i.e., the content field) and this can be used for vocabulary suggestion for administrator 20. This data can be anonymous, having no user concept. For LDAP feeder element 42, whitelisted terms are provided and, further, this can be used for personal vocabulary building, as discussed herein. In essence, this data belongs to a particular user; it is a document associated to a user. Thus, there are two distinct workflows occurring in the architecture, which processes different types of documents for different purposes.

Another aspect of the architecture involves a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10.

Turning to the infrastructure of FIG. 1, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that central engine 40 can readily be part of a server in certain embodiments of this architecture. In one example implementation, central engine 40 is a network element that facilitates or otherwise helps coordinate the expertise derivation operations, as explained herein. As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, central engine 40 includes software (e.g., as part of expertise tag derivation module 55) to achieve the expertise derivation operations, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of FIG. 1 may include any suitable algorithms, hardware, software, components, modules, interfaces, or objects that facilitate these expertise derivation operations. Additional operational capabilities of communication system 10 are detailed below with respect to FIGS. 2-8.

Figure 2:
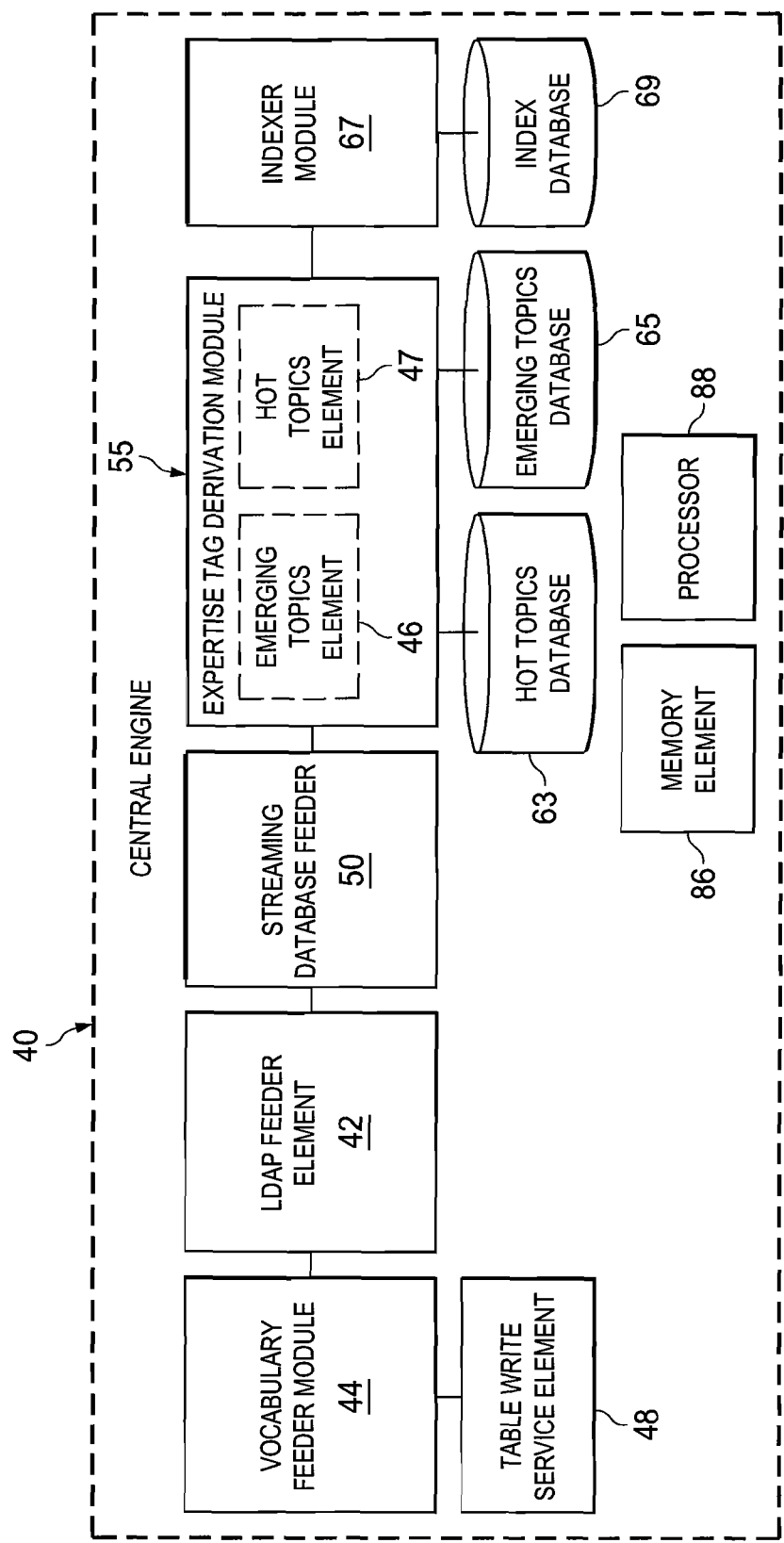
FIG. 2 is a simplified block diagram of a central engine in the communication system in accordance with one embodiment.

Turning to FIG. 2, FIG. 2 can be used to illustrate how the vocabulary can be developed. FIG. 2 is a simplified block diagram of an example implementation of central engine 40. In this particular configuration, central engine 40 includes a memory element 86 and a processor 88. Central engine 40 also includes expertise tag derivation module 55, streaming database feeder 50, emerging topics element 46, hot topics element 47, a hot topics database 63, an emerging topics database 65, an indexer module 67, and an index database 69. Indexer module 67 is configured to assist in categorizing the words (and/or noun phrases) collected in communication system 10. Those indices can be stored in index database 69, which can be searched by a given administrator or an end user in querying for particular experts. [Note that any type of search interface can be used to generate the search query, where such interfaces may be provided in a computer being used by end user 12, administrator 20, etc. For example, the search interface could simply be a link, an application, or some type of software: all of which could be used to communicate queries to some type of database (e.g., memory element).]

Along similar reasoning as discussed above, hot topics database 63 can store words associated with particular topics identified within the personal and/or business vocabulary. Emerging topics database 65 can involve multiple end users (e.g., along with administrator 20) in formulating or refining the aggregated personal vocabulary words and/or noun phrases. In regards to memory element 86, this storage area can store the resultant composite of vocabulary words (e.g., per individual), or such information can be stored in any of the other databases depicted in FIG. 2. It is imperative to note that this example of FIG. 2 is merely representing one of many possible configurations that central engine 40 could have. Other permutations are clearly within the broad scope of the tendered disclosure.

In operation of an example for deriving expertise, consider an instance where the most used topics in the corpus of data is router and IP networks, where the term 'MPLS' is being used the most by querying users, and where the emerging topic is Telepresence. The list of candidate tags could be provided as router, IP networks, MPLS, and Telepresence. Communicating these terms to an interface of the expertise derivation mechanism (e.g., end user 12 or administrator 20 interfacing with central engine 40) would offer the following results:

router→all employees in the routing company
'IP networks'→Expert1 (score 100), Expert2 (score 90), Expert3 (score 10)
'MPLS'→Expert4
'Telepresence'→Expert5.

The first term is simply too broad and it does not provide any filtering for this particular query. The term 'IP networks' can be suggested as a topic of expertise to Expert1 and to Expert2, but Expert3 can be dropped because his retrieved score is too low with respect to the other two (i.e., potentially better) experts. In a similar fashion, the term 'MPLS' can be suggested to Expert4 and the term 'Telepresence' to Expert5.

In regards to a different (underlying) data collection activity, suitable filtering and processing operations can be performed by network sensor 54, where those results may be provided to central engine 40 for identifying potential areas of expertise. For the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. Also, most search queries are noun phrases. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on central engine 40 (e.g., this could make implementation of the feedback loop more efficient). In other instances, the stop word removal feature is placed on network sensor 54 so that only the filtered fields are sent over to central engine 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag all user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc. Over a period, the user's personal vocabulary develops into a viable representation of subject areas (e.g. categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

Consider a case where end user 12 has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). Network sensor 54 can be provisioned at such a location in order to capture data and/or facilitate the identification of content, as described herein.

In one particular example, FIFO element 56 may receive data in a raw format. Text extraction module 58 may extract certain fields in order to identify a title, text, authorship, and a uniform resource locator (URL) associated with this particular document. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document. If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by administrator 20 based on particular user needs. The term 'whitelist' as used herein in this Specification is meant to connote any data sought to be targeted for inclusion into the resultant composite of words for administrator 20. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to administrator 20.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology."

Once this document has propagated through noun phrase extractor module 64, the document passes to whitelist 66. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field, and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic. In this particular arrangement, the following stop words can be removed: first name, last name, userid; functional stop word: A, an, the, etc.; email stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the central engine side). Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of central engine 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow, vocabulary feeder module 44 can read the concept field (e.g., created by the NLP module) and can feed the noun phrases to the raw vocabulary stream (e.g., "raw_vocab_stream" file). The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator interface 38 reads the weekly collapsed vocabulary table to display the terms. This element also suggests the top (e.g., 'n') words to administrator 20 for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator interface 38. In case the administrator chooses the "reject term" option, the system can add the term to the list of existing stop words and, further, propagate it to network sensor 54 to copy over to a file (e.g., adminStopWords.txt). Network collaboration platform 32 can create a file from the table suggested vocabulary terms (e.g., via commands including suggested by=system, and status=rejected). This file can be a part of the force sync files that can be pushed to the network sensor/central engine (depending on where the stop words mechanism resides). Emerging topics element 46 can look up emerging topics (e.g., within harvested documents) and, systematically, add the emerging and top topics to the architecture for the administrator to consider. Both options can be provided to administrator 20. The emerging topics can be similar to the experience tags such that topics growing in prominence over a given time interval (e.g., a week) can be suggested to administrator 20.

Note that one use of the resulting data is to create a dynamic file for each individual user that is tracked, or otherwise identified through communication system 10. Certain applications involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

FIG. 3 is a simplified table 90 associated with communication system 10. FIG. 3 can include terms and users to be associated with expertise topics, where absolute expertise (e.g., expertise related to the person in question, in the context of the enterprise, etc.) is being identified. Each person's potential expertise can be evaluated against other users of the system (e.g., relative expertise), where the other users can be provisioned or populated by an administrator, by themselves individually, or via their network data. The set of expertise topics can belong to vocabulary terms and noun-phrases that are derived.

Table 90 can relate to expertise derivation using suitable database structures. In operation, a database of terms can be maintained for the vocabulary and the noun phrases. For each term in the vocabulary, the top individuals that are most expressive on that topic (identified through network data analysis, or through provisioning) are mapped and maintained. Since the summarization of this dataset is used for efficiency purposes, a streaming database engine can be employed in one particular instance. Table 90 can be populated in one particular implementation as shown in FIG. 3, where the format assumes a maximum configured number of experts per topic being designated as two (in this example). Table 90 can be active in the sense that a count for each user can be kept systematically, where the top users (that have the highest counts) are reported. Each time that the expertise of a user is requested, a query user='username' can be made on the top user fields (e.g., TOP_USER1='username' OR TOP_USER2='username'). The resulting rows of table 90 are representative of the expertise derived for a particular user.

FIG. 4 is a simplified flowchart 100 illustrating one possible activity associated with the communication system 10. The flow of FIG. 4 begins at step 110, where each term in the vocabulary is being maintained such that it can be readily searched. For each term in the vocabulary, a query can be run, as shown in step 120. A current index is generated, or otherwise updated, as shown in step 130. Faceting (i.e., sorting) on an author field is subsequently run at step 140. The top author(s) can have their expertise tags updated with the current query term, as shown in step 150. If any type of time parameter is desirable, it may be included in an advanced query. At step 160, the authors can be sorted, where the top authors are extracted for this particular query. Subsequently, the particular expertise tag can be attached to specific user profiles, as shown in step 170.

When new words are being dynamically added to the vocabulary using different flows, the following activity can occur. A given database can track the noun-phrases extracted and, further, increment counts for these objects. In addition, an associated database can maintain the possible terms. In certain types of flows, an algorithm that can flatten out oscillation in expertise tags can be employed to eliminate rapidly changing tags (e.g. keep track of the last few sets of tags, delete a tag only if it is not on the list of tags for a certain time period, etc.).

Figure 5:
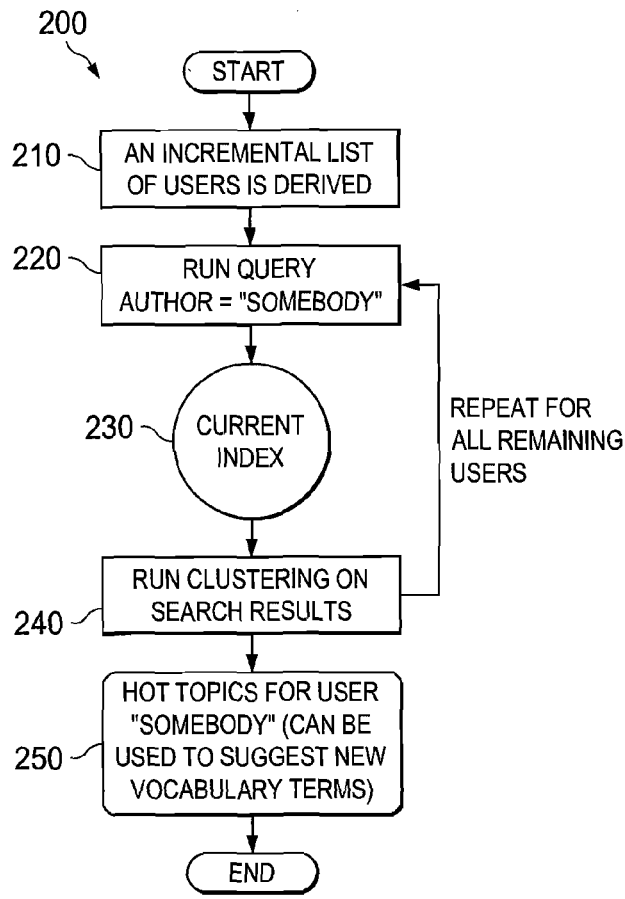
FIG. 5 is a simplified flowchart illustrating a set of example steps associated with the communication system.

FIG. 5 is a simplified flowchart 200 illustrating one activity associated with communication system 10. The activity being depicted by FIG. 5 relates to deriving relative expertise (e.g., expertise related to the person in question, even if their expertise in the context of the enterprise may be low when compared to other individuals). A hot topics element can be used as a summary of the topics, either on a per-user basis, on a system basis, etc.

This particular flow can begin at step 210, where an incremental list of users is derived. At step 220, a query is run for a particular author (e.g., "somebody"). The current index is provided at step 230, where a clustering operation can be run on the search results at step 240. Hot topics for this particular user is generated at step 250, where this information can be used to suggest new vocabulary terms. The particular clustering activity can be based on a live index in certain implementations. An offline task can be scheduled at a predefined time interval, which is configurable by the administrator. Each time the task is initiated, it can derive expertise for each user of the system. Optionally, the load can be spread across subgroups of users (e.g., midnight every day, users are processed having the last name in the intervals [A-C], [D-F], etc.). Another way to minimize excessive query processing would be to run one of the queries each time a user accesses his own profile page, combined with an email/uniform resource locator (URL) threshold (e.g., if a user sent more than 'x' emails, a query would be run, and an end user's profile would be updated with corresponding expertise tags).

Figure 6:
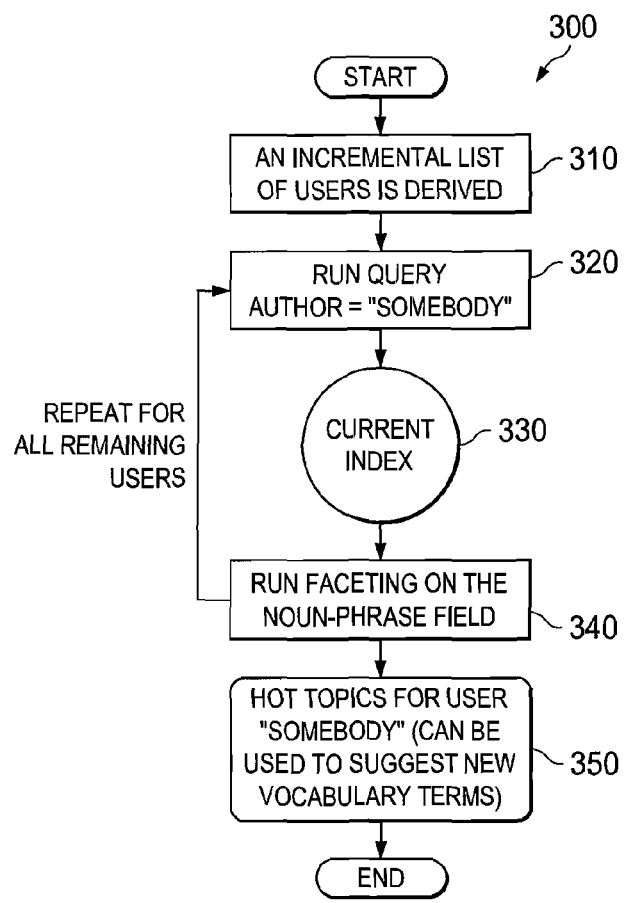
FIG. 6 is a simplified flowchart illustrating a set of example steps associated with the communication system.

FIG. 6 is a simplified flowchart 300 illustrating one activity associated with the communication system 10. The particular flow of FIG. 6 is associated with using noun-phrase extraction and facets. Instead of applying clustering, communication system 10 can use noun-phrase extractor module 64 (on the indexing side) to populate a 'noun-phrase' metadata field for each indexed document. Then, at query time, the same mechanisms described above can be used to evaluate the list of users and, for each query, (i.e., author='username'), the results can be faceted by the noun-phrase field. This will imply that the most used noun-phrases by that particular user can be shown as the hot topic for that person.

The flow of FIG. 6 begins at step 310, where an incremental list of users is derived. At step 320, a query is run for a particular author. At step 330, a current index is provided. Faceting is run for the noun-phrase fields in this data, as shown in step 340. Hot topics can be developed for this particular user (author=somebody), where the hot topics can be used to suggest new vocabulary terms, as shown in step 350.

Figures 7, 8:
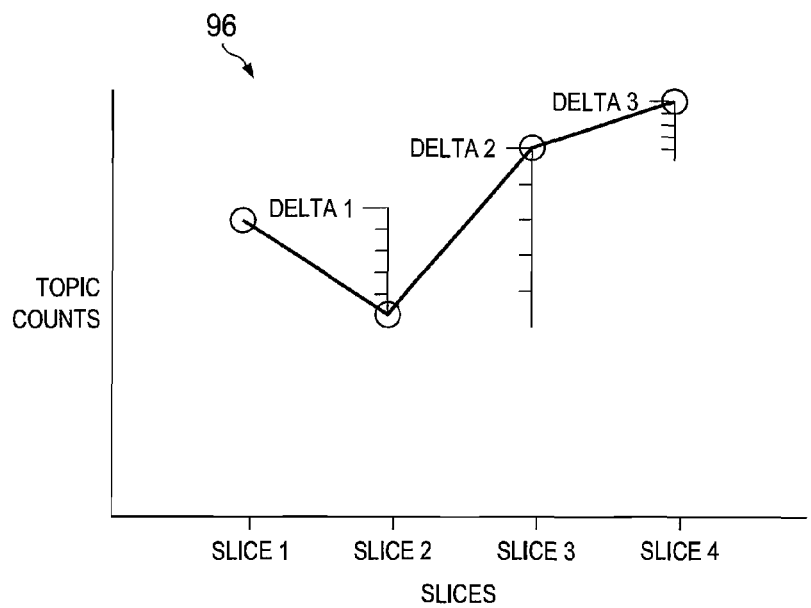
FIG. 7 is a simplified table illustrating a series of example users and terms associated with the communication system.
FIG. 8 is a simplified graph illustrating an example set of delta values associated with deriving potential topics associated with the communication system.

FIG. 7 is a simplified table 92 illustrating one possible object to be included in databases within communication system 10. Note that communication system 10 can maintain a database of users along with all possible keywords. Each time a term is seen in the indexed data, a corresponding counter can be incremented to reflect the number of occurrences for this particular term. Table 92 can be uniformly sorted (e.g., using streaming databases), or table 92 can be sorted at the time a list of 'hot topics' is needed (e.g., per user, sort the table and identify the top 'x' most used vocabulary terms).

In regards to aggregating hot topics over the set of users, the following flows are possible. For a first flow, a query can be made for all records, where results would be clustered to obtain the top results. For a second flow, a query can be made for specified records, where faceting can be executed on the noun-phrase field to obtain the top results. For a third type of flow, an aggregate user is added to the user pool, where statistics are maintained for this particular user. Note that if a set of top URLs needs to be derived, the same kind of database mechanism can be used to achieve this result (i.e., providing an active table of URLs seen by network sensor 54). In terms of configurable parameters, a given administrator can configure a number of per-topic experts, a number of per-user hot topics derived, a number of system-wide hot topics derived, etc. Application program interfaces (APIs) can be used for each of these configurable parameters in particular implementations of the present disclosure.

FIG. 8 is a simplified graph 96 illustrating an example set of delta values associated with deriving emerging topics. There are various possible algorithms that can be used to derive emerging topics, which commonly have a higher rate of change/incidents over time than the top topics. In a first example method, existing database tables can be used to compute changes between a given data segment (e.g., a slice), as depicted by graph 96.

The computation can involve using several measurements of change, or a combination of these elements. The appropriate measurements can include average delta, average positive delta, and the maximum delta. In one particular implementation, the average delta can be defined as: $(-\text{delta1}+\text{delta2}+\text{delta3})/3$. Additionally, the average positive delta can be defined as: $(\text{Delta2}+\text{Delta3})/3$. Furthermore, the maximum delta can be defined as delta2, as is detected in graph 96. In a second methodology, streaming databases can be used to directly derive a rate of change from the initial raw streams. While this method is more accurate (because it can use a broader set of topics, not only the ones in a top topics table), it may necessitate schema.

For deriving emerging topics, the first methodology identified above can be used. The measurements presented can be calculated, where internal knobs can be exposed to be able to choose one (or a combination) of these measurements. The final result can be a list of ordered topics (e.g., ordered using any of these parameters). A simple API can be used in such activities. For scheduling semantics, a quartz scheduling mechanism (also used by streaming databases) can be used to schedule a job that can query the associated database on a daily basis (e.g., verifying if the database has been changed, where iteration over the topics can subsequently occur). For topics retrieval, a database connection can be opened, where the collapsed topics (e.g., weekly) table can be queried to retrieve a list of unique top topics. The list of topics can be iterated, where the slices (daily) can be retrieved, along with their slice access counts. The deltas can then be suitably computed, as described above.

Software for providing intelligent expertise derivation can be provided at various locations of communication system 10. In one example implementation, this software is resident in a network element, such as central engine 40 and/or network sensor 54, or in another network element for which this capability is relegated. In other examples, this could involve combining central engine 40 and/or network sensor 54 with an application server or a gateway, or some proprietary element, which could be provided in (or be proximate to) these identified network elements, or this could be provided in any other device being used in a given network. In one specific instance, central engine 40 provides the expertise derivation features explained herein, while network sensor 54 can be configured to offer the raw data collection activities detailed herein. In such an implementation, network sensor 54 can initially receive the data, employ its filtering functions, and then send the results to expertise tag derivation module 55, which can develop or otherwise process this information for deriving expertise.

In other embodiments, the expertise derivation feature may be provided externally to central engine 40, or included in some other network device, or in a computing mechanism to achieve these intended functionalities. As identified previously, a network element can include software to achieve the expertise derivation operations, as outlined herein in this document. In certain example implementations, the expertise derivation functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the expertise derivation operations as outlined herein. Additionally, each of these devices may include a processor that can execute software or an algorithm to perform the expertise derivation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method for deriving user expertise in a network environment, comprising:
   receiving at a network sensor coupled to a central engine comprising a processor and a memory element data propagating in the network environment;
   evaluating at the network sensor one or more fields in the data, wherein the evaluating includes searching and filtering for nouns and noun phrases;
   identifying selected terms within the nouns and noun phrases, wherein the selected terms correspond to one or more topics, wherein the selected terms are tagged by a central engine with respective expertise tags;
   identifying at the network sensor in real time a first user who generated the data and a second user who consumed the data;
   adding the selected terms to a first personal vocabulary of the first user and a second personal vocabulary of the second user, wherein the first personal vocabulary is associated with expertise of the first user in the one or more topics and the second personal vocabulary is associated with expertise of the second user in the one or more topics, wherein the selected terms are assigned a higher weight in the first personal vocabulary than in the second personal vocabulary; and
   associating the first user and the second user with the expertise tags.

2. The method of claim 1, wherein the identifying of the selected terms includes using synaptic analysis or word occurrence counting to identify the selected terms to be tagged with the expertise tags.

3. The method of claim 1, wherein the expertise tags are provided in respective profiles for the first user and the second user.

4. The method of claim 1, further comprising:
   sorting a list of additional users associated with a new search query; and
   comparing occurrences of additional terms used by the additional users in order to derive an absolute expertise to be included in a new response for the new search query.

5. The method of claim 1, further comprising:
   deriving a relative expertise, among users, for a new search query that includes new terms, wherein the relative expertise is determined by comparing occurrences of the new terms used by the users.

6. The method of claim 1, further comprising:
   maintaining a list of emerging topics associated with specific areas of expertise, wherein the emerging topics are determined by aggregating occurrences of emerging topic terms associated with additional data propagating in the network environment.

7. The method of claim 1, further comprising:
   maintaining the nouns and noun phrases within a database; and incrementing a counter for the selected nouns and noun phrases as they appear in additional data propagating in the network environment.

8. Logic encoded in one or more tangible media that includes code for execution and when executed by a processor is operable to perform operations comprising:
- receiving data propagating in a network environment;
- evaluating one or more fields in the data, wherein the evaluating includes searching and filtering for nouns and noun phrases;
- identifying selected terms within the nouns and noun phrases, wherein the selected terms correspond to one or more topics, wherein the selected terms are tagged with respective expertise tags;
- identifying in real time a first user who generated the data and a second user who consumed the data;
- adding the selected terms to a first personal vocabulary of the first user and a second personal vocabulary of the second user, wherein the first personal vocabulary is associated with expertise of the first user in the one or more topics and the second personal vocabulary is associated with expertise of the second user in the one or more topics, wherein the selected terms are assigned a higher weight in the first personal vocabulary than in the second personal vocabulary; and
- associating the first user and the second user with the expertise tags.

9. The logic of claim 8, wherein the identifying of the selected terms includes using synaptic analysis or word occurrence counting to identify the selected terms to be tagged with the expertise tags.

10. The logic of claim 8, wherein the expertise tags are provided in respective profiles for the first user and the second user.

11. The logic of claim 8, the processor being further operable to perform operations comprising:
- sorting a list of additional users associated with a new search query; and
- comparing occurrences of additional terms used by the additional users in order to derive an absolute expertise to be included in a new response for the new search query.

12. The logic of claim 8, the processor being further operable to perform operations comprising:
- deriving a relative expertise, among users, for a new search query that includes new terms, wherein the relative expertise is determined by comparing occurrences of the new terms used by the users.

13. The logic of claim 8, the processor being further operable to perform operations comprising:
- maintaining a list of emerging topics associated with specific areas of expertise, wherein the emerging topics are determined by aggregating occurrences of emerging topic terms associated with additional data propagating in the network environment.

14. The logic of claim 8, the processor being further operable to perform operations comprising:
- maintaining the nouns and noun phrases within a database; and
- incrementing a counter for the selected nouns and noun phrases as they appear in additional data propagating in the network environment.

15. An apparatus, comprising:
- memory element configured to store data;
- a processor operable to execute instructions associated with the data;
- a network sensor configured to:
  - receive data propagating in a network environment;
  - identify in real time a first user who generated the data and a second user who consumed the data;
  - evaluate one or more fields in the data, wherein the evaluating includes searching and filtering for nouns and noun phrases; and
- a central engine configured to interface with the memory element, the processor, and the network sensor, the central engine being configured to:
  - identify selected terms within the nouns and noun phrases, wherein the selected terms correspond to one or more topics, wherein the selected terms are tagged with respective expertise tags;
  - associate the first user and the second user with the expertise tags and
  - add the selected terms to a first personal vocabulary of the first user and a second personal vocabulary of the second user, wherein the first personal vocabulary is associated with expertise of the first user in the one or more topics and the second personal vocabulary is associated with expertise of the second user in the one or more topics, wherein the selected terms are assigned a higher weight in the first personal vocabulary than in the second personal vocabulary.

16. The apparatus of claim 15, wherein identification of the selected terms includes using synaptic analysis or word occurrence counting to identify the selected terms to be tagged with the expertise tags.

17. The apparatus of claim 15, wherein the expertise tags are provided in respective profiles for the first user and the second user.

18. The apparatus of claim 15, further comprising:
- an expertise tag derivation module included in the central engine and being configured to derive a relative expertise, among users, for a new search query that includes new terms, wherein the relative expertise is determined by comparing occurrences of the new terms used by the users.

19. The apparatus of claim 15, wherein the central engine is further configured to:
- maintain the nouns and noun phrases within a database; and
- increment a counter for the selected nouns and noun phrases as they appear in additional data propagating in the network environment.

20. The apparatus of claim 15, further comprising:
- a search interface configured to initiate the search query for the particular expertise within a database that includes at least some of the selected words.

* * * * *